(12) United States Patent
Engel

(10) Patent No.: US 7,855,548 B2
(45) Date of Patent: Dec. 21, 2010

(54) LOW LABOR ENCLOSURE ASSEMBLY

(75) Inventor: John B. Engel, Tigard, OR (US)

(73) Assignee: Levinton Manufacturing Co., Inc., Melville, NY (US)

( * ) Notice: Subject to any disclaimer, the term of this patent is extended or adjusted under 35 U.S.C. 154(b) by 615 days.

(21) Appl. No.: 11/618,357

(22) Filed: Dec. 29, 2006

(65) Prior Publication Data

US 2007/0230144 A1    Oct. 4, 2007

Related U.S. Application Data

(60) Provisional application No. 60/787,074, filed on Mar. 29, 2006.

(51) Int. Cl.
  *G01R 1/04* (2006.01)
  *H05K 5/03* (2006.01)
  *H05K 7/10* (2006.01)

(52) U.S. Cl. .................. 324/156; 361/752; 361/758

(58) Field of Classification Search ................ 324/156; 361/679.01, 728, 736, 740, 742, 747, 748, 361/752, 758–761, 783
See application file for complete search history.

(56) References Cited

U.S. PATENT DOCUMENTS

| | | | | |
|---|---|---|---|---|
| 2,787,398 | A | * | 4/1957 | Smith ........................ 220/241 |
| 3,653,021 | A | | 3/1972 | Litman et al. |
| 4,793,814 | A | | 12/1988 | Zifcak et al. |
| 5,017,783 | A | | 5/1991 | Mousavi |
| 5,026,990 | A | | 6/1991 | Marman et al. |
| 5,155,905 | A | | 10/1992 | Miller, Jr. et al. |
| 5,221,919 | A | | 6/1993 | Hermans |
| 5,258,889 | A | * | 11/1993 | Belanger, Jr. ............... 361/740 |
| 5,393,256 | A | | 2/1995 | Mitchell et al. |

(Continued)

OTHER PUBLICATIONS

Patent Cooperation Treaty, International Search Report, PCT/US2007/065523, Aug. 5, 2008, 1 page.

(Continued)

*Primary Examiner*—Bot L LeDynh
(74) *Attorney, Agent, or Firm*—Marger Johnson & McCollom PC

(57) ABSTRACT

There is disclosed a base member for holding, without screws, a printed circuit board having conductive traces and electronic components and which can fit into an electric outlet box. The base member has walls which define a cavity where at least one wall of the cavity has a rib, the top of which functions as a stop for the printed circuit board. A cap having snap features adapted to engage the walls of the cavity restricts removal of the printed circuit board when snapped into position on top of the printed circuit board. The cap conceals the electronics on the printed circuit board and has at least one rib on its bottom surface to apply pressure to the printed circuit board assembly to help hold it in place. An aperture in the cap provides access to a pin header which is electrically connected to the printed circuit board. A screw terminal block is provided to connect the terminals on the pin header to a sensor. The printed circuit board has one edge an open side hour glass shape aperture which provides strain relief for wires from the printed circuit board. Opposite ends of the aperture hold two wires captive and the space between the two wires holds captive a third wire.

4 Claims, 3 Drawing Sheets

U.S. PATENT DOCUMENTS

| | | | |
|---|---|---|---|
| 5,497,305 A | | 3/1996 | Pastrick et al. |
| 5,595,362 A | * | 1/1997 | Rinderer et al. ............ 248/27.1 |
| 5,728,973 A | * | 3/1998 | Jorgensen ................... 174/666 |
| 5,763,830 A | | 6/1998 | Hsueh |
| D401,175 S | | 11/1998 | Bender et al. |
| D404,325 S | | 1/1999 | Bender et al. |
| D404,326 S | | 1/1999 | Bender et al. |
| 6,082,894 A | | 7/2000 | Batko et al. |
| 6,155,887 A | | 12/2000 | Cuff et al. |
| 6,222,191 B1 | | 4/2001 | Myron et al. |
| 6,326,776 B1 | * | 12/2001 | Yoshiuchi et al. ........... 324/156 |
| 6,663,414 B2 | | 12/2003 | Kume et al. |
| 7,195,381 B2 | | 3/2007 | Lynam et al. |
| 7,306,493 B2 | | 12/2007 | Seo et al. |
| 7,445,455 B2 | | 11/2008 | Yokozuka et al. |
| 2005/0043907 A1 | | 2/2005 | Eckel et al. |
| 2006/0138329 A1 | | 6/2006 | Wu et al. |
| 2006/0194504 A1 | | 8/2006 | Ragonetti et al. |
| 2007/0030154 A1 | | 2/2007 | Aiki et al. |
| 2007/0085755 A1 | | 4/2007 | Webb et al. |
| 2007/0184679 A1 | | 8/2007 | Schmid |
| 2007/0264849 A1 | | 11/2007 | Steckler et al. |

OTHER PUBLICATIONS

Patent Cooperation Treaty, Written Opinion of the International Searching Authority, PCT/US2006/32965, Jan. 19, 2007, 4 pages.

Patent Cooperation Treaty, International Search Report, PCT/US2006/32965, Jan. 19, 2007, 3 pages.

Leviton, Low Voltage Switches, LIT-32712-00 Rev B, Tualatin, OR, Feb. 8, 2005, 2 pages.

Sensorswitch Specialty Power Packs, Sensor Switch, Inc., Wallingford, CT, Dec. 21, 2004, 2 pages.

* cited by examiner

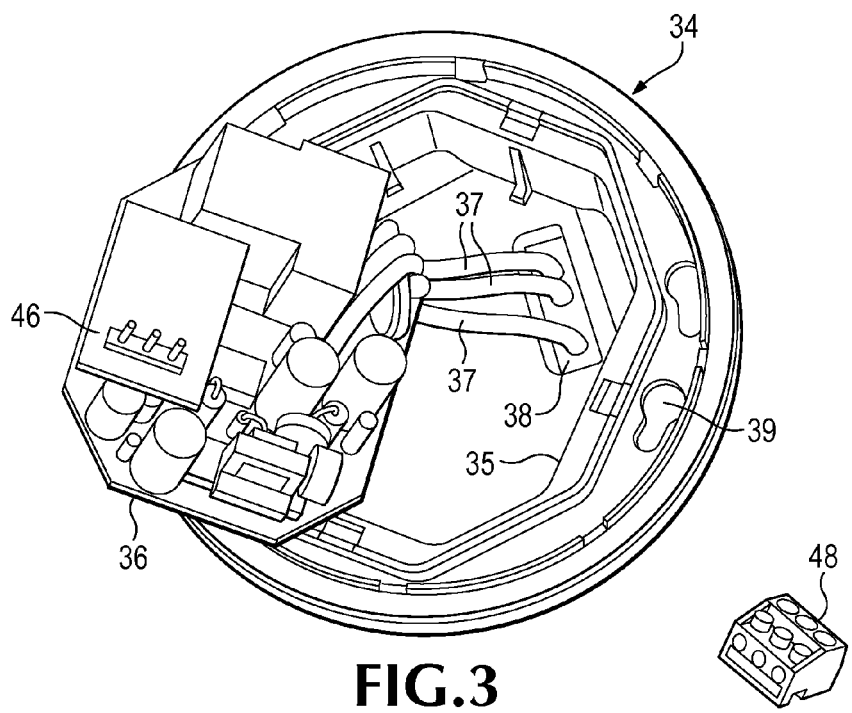
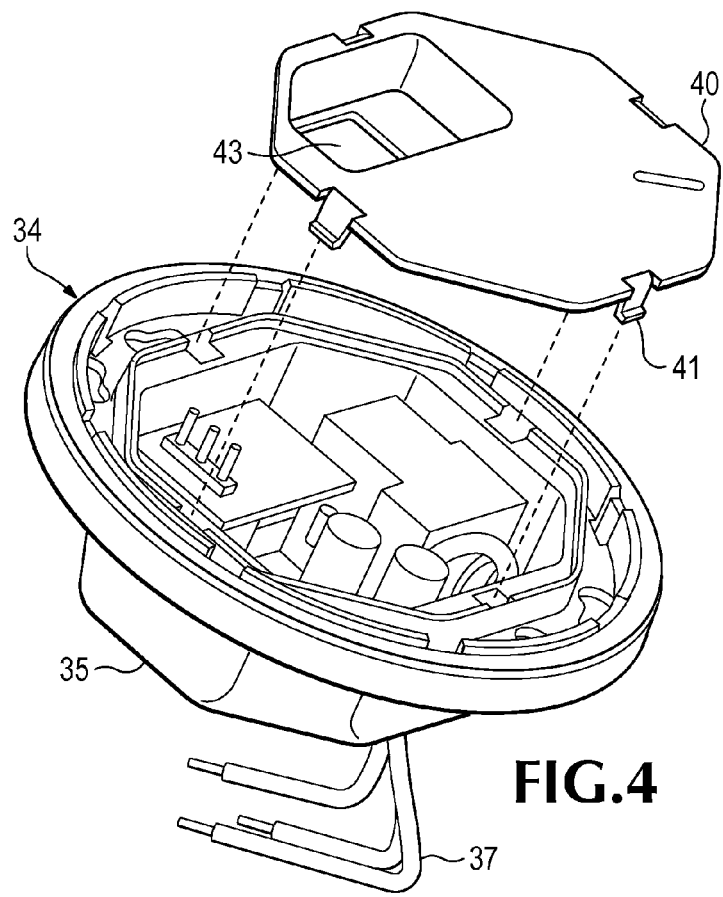
FIG.3
FIG.4

LOW LABOR ENCLOSURE ASSEMBLY

This application claims priority pursuant to 35 U.S.C. 119 (e) from U.S. Provisional Application having Application Ser. No. 60/787,074 filed Mar. 29, 2006.

BACKGROUND OF THE INVENTION

1. Field of the Invention

The present invention relates generally to an enclosure adapted to receive and hold captive a printed circuit board without requiring screws and where the printed circuit board is adapted to provide strain relief for wires from the printed circuit board.

2. Description of the Related Art

Today, automation systems which include sensors are being installed in more and more buildings, including both new construction and in structures that are being renovated and/or rebuilt. The incentives for putting automation systems into a building are numerous. High on the list are occupancy sensors to help reduce costs by turning off lights when a person leaves a room, more efficient use of energy, simplified control of the building systems, ease of maintenance and for effecting changes to the buildings systems. Facility managers prefer to install systems that can interoperate amongst each other. Interoperability is defined as being able to link together different products, devices and systems for different tasks and developed by different manufacturers to form flexible, functional control networks.

An example of a typical automation system includes security systems which includes occupancy sensors and/or lighting controls, and HVAC systems, all possibly provided by different manufacturers. It would desirable if these separate disparate systems can quickly and easily be mounted to a standard wall or ceiling electrical outlet box.

Prior art systems generally comprised closed proprietary equipment supplied by a single manufacturer. With this type of proprietary system, the installation, servicing and future modifications of the component devices in the system are restricted to a single manufacturer's product offering and technical capability. In addition, it is usually very difficult or impossible to integrate new technology developed by other manufacturers. If the technology from other manufactures can be integrated, it may be too costly to consider.

Thus, it is desirable to create a system whereby individual sensors, processors and other components can be easily mounted to an outlet box. A few of the benefits of using an open system include increased number of design options for the facility manager, lower design and installation costs because the need for customized hardware is greatly reduced and system startup is quicker and simpler.

An integral part of any automation control system are the sensors and transducers used to gather data on one or more physical parameters, where one such parameter is occupancy or motion. It would be desirable if a plurality of sensor functions could be quickly and easily fitted into a standard single wall box opening and be able to be powered from and communicate with one or more control units, i.e., processing nodes on a control network.

The number and types of sensors in the device can be, but not limited to, multiple, dual or single occupancy and security sensing via means including passive infrared, ultrasonic, RF, audio or sound or active infrared. In addition, other multiple or singular transducers may be employed such as temperature sensors, relative humidity sensors, ambient light sensors, CO sensors, smoke sensors, security sensors, air flow sensors, switches, and the like.

In order to minimize the number of unique devices that are installed in a room, it is desirable to have a sensor device reliably perform as many functions as possible as this will reduce the wiring costs as well as the number of devices required to be installed on the walls of the room. Additionally, from an aesthetic point of view, architects are under increasing demand by their clients to reduce the number of unique sensor nodes in any given room.

Further, it is also desirable to have the transducers or sensors communicate with a microprocessor or microcontroller that can be used to enhance the application of the transducer and be powered by a stand alone unit which includes both the sensor and a printed circuit board which can include a power pack in a single enclosure where the printed circuit board can be quickly and easily inserted and held captive in the enclosure without requiring screws.

At the present time low voltage sensors such as occupancy sensors can be wired to a relay or dimmer panel, or to a localized power pack that houses a single load relay and generates the low voltage power for the sensor. Another option is to wire low voltage sensors to a stand alone unit which includes both the occupancy sensor and the power pack in a single enclosure. One problem with this method is that the manufacturer essentially doubles the amount of products which results in decreased economics.

Referring to FIG. 1, there is shown a prior art mounting base 20 used by many low voltage occupancy sensors. The base 20 shown in FIG. 1 mounts either to a ceiling or an electrical outlet box with screws 22 which pass through slots 24. A centrally located aperture 26 is provided to route low voltage wires. A low voltage sensor is mounted to the base 20 or back cover after the installation wiring is completed.

Referring to FIG. 2, there is shown the base 20 being attached to a 4" octagon electrical outlet box 28 with screws 22. The cover 30 supports the sensor and is attached either to the base 20 or to the box 28 with screws after the low voltage wires 32 from the sensor are passed through the centrally located opening in the base and are connected to system wires. The wires from the sensor pass directly through the base and are connected to a printed circuit board which is mounted either in the outlet box with screws or at a remote location, also with screws or a printed circuit board holding structure. The printed circuit board is used to provide power and control connections for the occupancy sensor. Wires which are not clamped in place, particularly low voltage wires which are normally connected directly to a printed circuit board of a sensor, can easily be disconnected from the printed circuit board when subjected to a sudden tug or a sustained strain or tension.

What is needed is an enclosure adapted to receive and hold captive a printed circuit board without requiring or using screws, has a minimum number of parts and an advantage geometry and where the printed circuit board is configured to provide strain relief for wires from the printed circuit board.

SUMMARY OF THE INVENTION

There is disclosed a base member for holding, without screws, a printed circuit board having conductive traces and electronic components and which can fit into an electric outlet box. The base member has walls which define a cavity where at least one wall of the cavity has a rib, the top of which functions as a stop for the printed circuit board. A cap having clips adapted to engage the walls of the cavity restricts removal of the printed circuit board when snapped into position on top of the printed circuit board. The cap conceals the electronics on the printed circuit board and has at least one rib on its bottom surface to apply pressure to the printed circuit board assembly to help hold it in place. An aperture in the cap provides access to a pin header which is electrically connected to the printed circuit board. A screw terminal block is provided to connect the terminals on the pin header to a sensor. The printed circuit board has one edge an open side hour glass shape aperture which provides strain relief for wires from the printed circuit board. Opposite ends of the aperture hold two wires captive and the space between the two wires holds captive a third wire.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals where:

FIG. 3 is a partial exploded perspective view showing a printed circuit board assembly being positioned into a base member;

FIG. 4 is an exploded perspective view of the printed circuit board mounted within the base member, a snap on cap which fits on top of the printed circuit board and the components mounted thereon and a terminal block for connecting the printed circuit board to a device such as a sensor;

DETAILED DESCRIPTION

Figure 1:
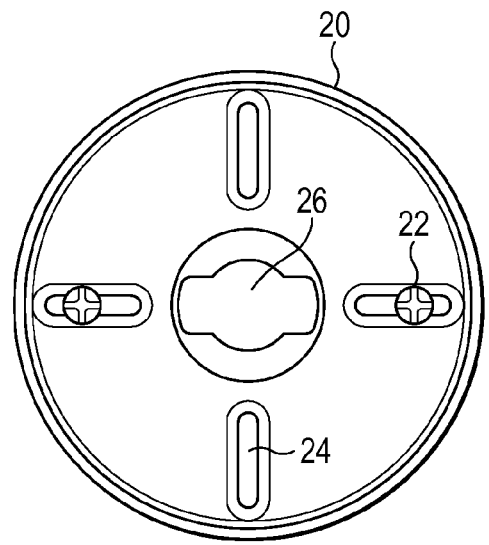
FIG. 1 shows a prior art base for mounting a low voltage sensor such as an occupancy sensor to a ceiling.
Figure 2:
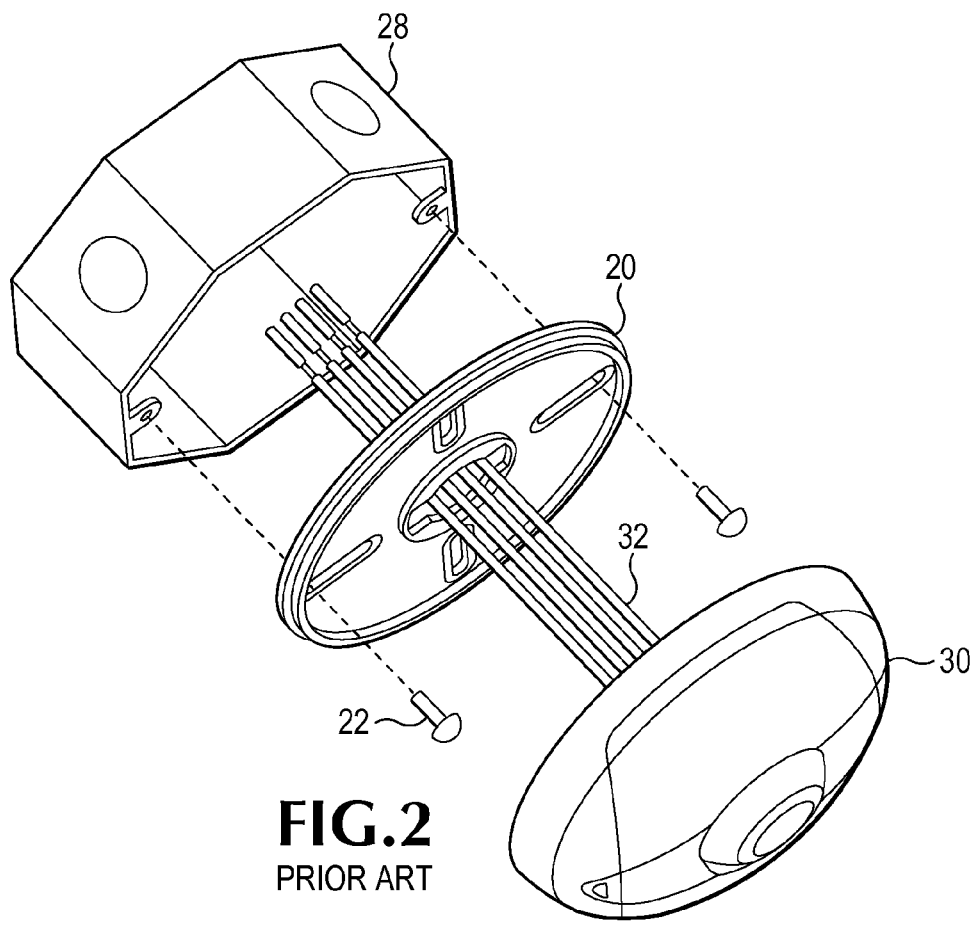
FIG. 2 is an exploded view of a prior art octagon electrical outlet box, a base and a cover for receiving a sensor.

Referring to FIG. 3, there is shown a partial exploded perspective view of a base member 34 for receiving a printed circuit board 36 having conductive traces connecting electronic components on its top surface and conductive wires 37 which connect the electronic components on the printed circuit board to an external circuit. The base member 34 has an octagon shaped base 35 which is sized to fit within a 4 inch octagon electric outlet box and an outward extending cover plate member 37 which covers the space between the electric outlet box and the wall or ceiling when the base 35 is fitted into an electric outlet box. It is to be noted that the base member can be placed directly into an opening of a wall or ceiling, or in an outlet box that is in a wall or ceiling. The base member is adapted to be coupled to the electrical outlet box with screws which are inserted through mounting holes 39 and thread into threaded openings in the outlet box. The wires 37 from the printed circuit board are captured by an open side hour glass shape aperture on the circuit board to provide strain relief for the wires, and the free ends of the captured wires pass through apertures 38 in the bottom of the base member. When the base member is fitted into an outlet box, the wires 37 also pass through openings in the outlet box for connection to wires of the sensor system. The open side hour glass shape aperture along an edge of the printed circuit board holds and provides strain relief to the wires 37 from the board. Prior to placing the printed circuit board into the base member, two wires are placed into the hour glass shape aperture, one at each end, and a third wire is placed between the two wires. As the printed circuit board 36 is placed into the base member, the center wire is pushed by the wall of the base member toward the two wires in the ends of the hour glass shape aperture in the circuit board. Thus, when the circuit board is in the base member, the center wire rests against the inner wall of the base member and presses against the two wires in the ends of the aperture, and all of the wires are held securely in place. The combination of the pressure applied to the wires, in combination with a loop which is formed by each wire between the aperture in the printed circuit board and the electrical connection of the wire to the printed circuit board helps to both hold the wires securely in place and provide strain relief for the wires.

The enclosure assembly has only three parts, the base member 34, the cap 40, and the printed circuit board 36 and the components mounted thereon. The printed circuit board has an hour glass shaped aperture to provide strain relief for the wires from the board. Another part which can be included is a slip-on terminal block 48. To assemble, the printed circuit board is placed into the base member and is held in position by snapping the cap into position within the base member on top of the printed circuit board.

Continuing with FIG. 3, the printed circuit board assembly 36 is shown prior to being placed into the cavity of the base member 34 and is connected by soldered or the like to a pin header 46 which is provided to connect the printed circuit board to a device such as a sensor through terminal block. An integral spacer can be used to help simplify the hand soldering process. The printed circuit board and its components provides the power and control connections for a sensor which can be an occupancy sensor. Two ribs extend partially up a side wall surface of the cavity of the base member which can be an octagon shape base 35 (see FIG. 4) similar to an octagon electric outlet box. The ribs are placed such that they start at the bottom of the base 35 and stop at the point where the bottom of the printed circuit board comes to rest when the board is seated in position. Thus, the top of the ribs define the position of the printed circuit board in the shaped base 35. In one embodiment, the printed circuit board is seated on top of the ribs and, in another embodiment, the pin header is seated on top of the ribs. In the last mentioned embodiment, the ribs in combination with the pin header which is soldered onto the top of the printed circuit board assembly and is seated on the ribs, and the cap 40 provide the required support for the printed circuit board.

Once the circuit board is seated properly into the base 35, the cap 40 is placed over the printed circuit board. As the cap is pushed down, snap features such as spring clips 41, which are attached to the cap, engage the inside surface of the octagon shaped base and hold the cap in place. The cap covers the printed circuit board and the electronics on the board. In addition, the cap has a rib on its bottom surface which is located to press on an electronic component rigidly mounted to the board such as a relay. This applies pressure to the printed circuit board assembly and helps to hold the board in place without the use of screws. An aperture 43 in the cap 40 allows the pin contacts on the pin header 46 to be exposed for connection to the screw terminal block 48.

Referring to FIG. 4, there is shown an exploded view of the printed circuit board located within the base, and the cap 40 having snap features 41 and opening 43 to allow terminal block 48 to be connected to pin contacts of pin header 46. The terminal block 48, which is connected to the printed circuit board after the cap 40 is placed over the printed circuit board, is used to allow a sensor to be connected to the printed circuit board.

Figure 5:
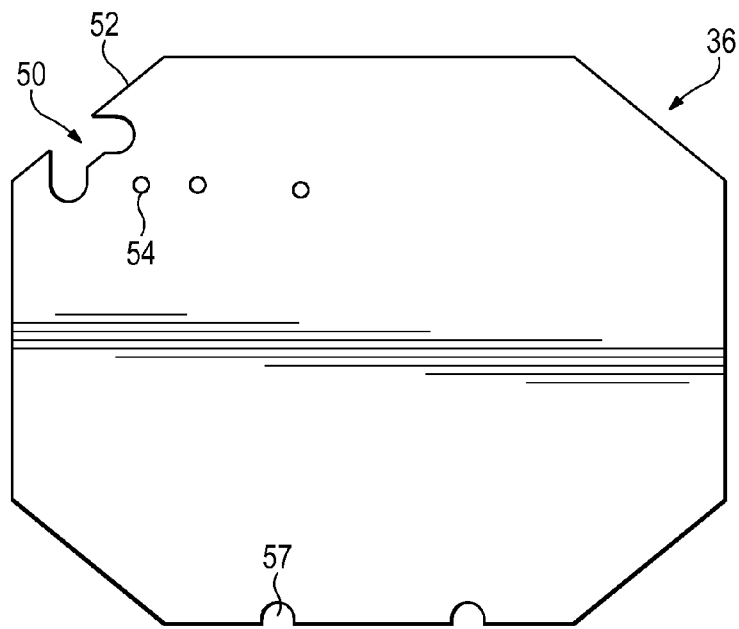
FIG. 5 is a top view of the printed circuit board having an open side hour glass shape aperture for providing strain relief to wires captured therein.

Referring to FIG. 5, there is shown a top view of the printed circuit board 36, absent conductive traces and electrical components and showing the open side hour glass shape aperture 50 along one side edge of the printed circuit board for capturing wires and providing strain relief to wires from the printed circuit board. The open side hour glass shape aperture at an edge of the printed circuit board provides strain relief for wires from the printed circuit board which are connected to an external circuit. The printed circuit board can be any shape such as round, square, oval, octagon etc. which will fit in base 35 and of a size where the edge 52 of the board will fit close to or contact the sides of the base. Small openings 54 shown in the board are solder openings for wires, and the semicircular apertures 57 located at an edge of the board are provided for wires or to engage the ribs on the inside surface of the wall of the base 35. The open side hour glass shape aperture along the edge of the circuit board, by itself and without any additional structure, provides strain relief to wires from the board. The hour glass shape aperture can be formed by stamping, routing, cutting etc., or any other method which is convenient to use. The open side hour glass shape aperture or opening, is sized to capture three wires, one at each end of the hour glass shaped aperture and one wire between the end wires. The wires in the ends of the hour glass aperture are held in place by friction during installation. As the printed circuit board is positioned into the cavity of the base member, the center wire is pressed by the wall of the base 35 into the space between the two wires in the ends of the open side hour glass shape aperture and against these wires. The combination of the pressure applied to the wires in the hour glass shape aperture and a loop in the wires from their connection at the printed circuit board to the hour glass shape aperture provides strain relief to the wires by allowing the wires to be held securely in place in a strain free manner. Additionally, as noted above, the open side hour glass shape aperture helps to hold the wires in place during installation.

Figure 6:
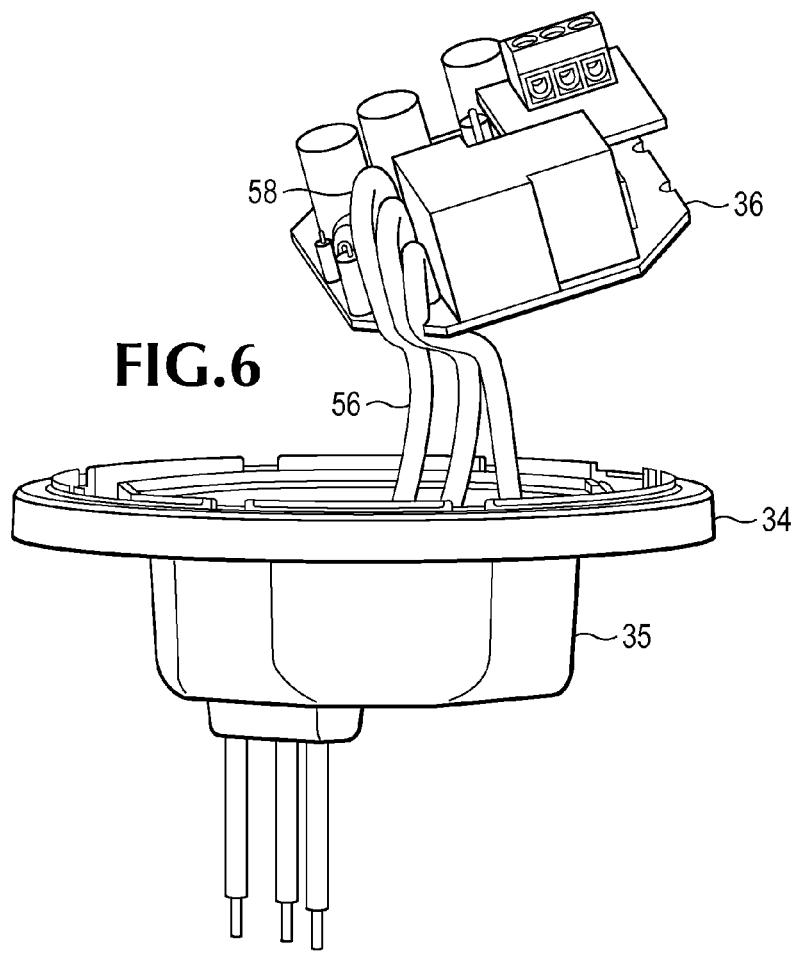
FIG. 6 is an exploded partial perspective view showing wires connected to components on the printed circuit board being held captive by the open side hour glass shape aperture on the printed circuit board of FIG. 5.

FIG. 6 is a partial perspective exploded view showing the wires of the printed circuit board being held captive by the open side hour glass shape aperture along an edge of the circuit board and passing through the bottom of the base 35, and coming out the bottom of the base. The wires 56 are electrically connected to the printed circuit board and are bent to form a loop 58 before they are pushed into the hour glass shaped aperture in the board and before the board is placed into the base 35. After the wires are placed into the hour glass shaped aperture, the wires are pushed through the apertures 38 in the bottom of the base and the printed circuit board is then positioned in the base. Thereafter, as the cap 40 is placed into the base the clips 41 engage the side wall of the base to lock the printed circuit board to in the base without screws. Octagon shaped base 35 which forms the bottom of base member 34 is sized to receive electrical components on the printed circuit board and to fit within a wall box 20.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. An assemblage comprising:
   a base member having a cavity with walls for receiving a printed circuit board;
   a printed circuit board sized to fit within said cavity;
   a cap member sized to fit within said cavity; and
   a pin header coupled to said printed circuit board for connecting a sensor to said printed circuit board;
   wherein said cap member when positioned in said cavity over said printed circuit board engages at least one side wall of said cavity to hold said printed circuit board in said cavity without screws;
   wherein the cavity is sized to fit within a standard electrical box;
   wherein said base member has a stop member which limits the distance that the printed circuit board can move into said cavity; and
   wherein said cap member has at least one clip positioned to engage a wall of said cavity to restrict removal of the printed circuit board from said cavity.

2. An assemblage comprising:
   a base member having a cavity with walls for receiving a printed circuit board;
   a printed circuit board sized to fit within said cavity;
   a cap member sized to fit within said cavity; and
   a pin header coupled to said printed circuit board and projecting through said cap member to connect a sensor to said printed circuit board;
   wherein said cap member when positioned in said cavity over said printed circuit board engages at least one side wall of said cavity to hold said printed circuit board in said cavity without screws;
   wherein the cavity is sized to fit within a standard electrical box;
   wherein said base member has a stop member which limits the distance that the printed circuit board can move into said cavity; and
   wherein said cap member has at least one clip positioned to engage a wall of said cavity to restrict removal of the printed circuit board from said cavity;
   wherein said cap member, when placed over said printed circuit board, covers said board.

3. The assemblage of claim 2 wherein said pin header is slidably coupled to a terminal block.

4. An assemblage comprising:
   a base member having a cavity with walls for receiving a printed circuit board;
   a printed circuit board sized to fit within said cavity; and
   a cap member sized to fit within said cavity;
   wherein said cap member when positioned in said cavity over said printed circuit board engages at least one side wall of said cavity to hold said printed circuit board in said cavity without screws;
   wherein the cavity is sized to fit within a standard electrical box;
   wherein the cap member includes a recessed portion; and
   wherein the recessed portion is sized to receive a terminal block to couple the assemblage to a sensor.

* * * * *

UNITED STATES PATENT AND TRADEMARK OFFICE
CERTIFICATE OF CORRECTION

PATENT NO. : 7,855,548 B2
APPLICATION NO. : 11/618357
DATED : December 21, 2010
INVENTOR(S) : John B. Engel Page 1 of 1

It is certified that error appears in the above-identified patent and that said Letters Patent is hereby corrected as shown below:

On the Title Page, item (73), the Assignee "Levinton Manufacturing Co., Inc." should read -- Leviton Manufacturing Co., Inc. --.

Signed and Sealed this
Thirtieth Day of August, 2011

David J. Kappos
*Director of the United States Patent and Trademark Office*